US006726113B2

(12) United States Patent
Guo

(10) Patent No.: US 6,726,113 B2
(45) Date of Patent: Apr. 27, 2004

(54) TEMPERATURE CONTROL STRATEGY UTILIZING NEURAL NETWORK PROCESSING OF OCCUPANCY AND ACTIVITY LEVEL SENSING

(75) Inventor: Charles Guo, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/082,792

(22) Filed: Feb. 25, 2002

(65) Prior Publication Data

US 2003/0160103 A1 Aug. 28, 2003

(51) Int. Cl.[7] .................. G05D 23/00; G05D 15/00
(52) U.S. Cl. .................. 236/228.4; 236/47; 700/276
(58) Field of Search ................. 236/47, 78 D; 700/276; 62/228.4

(56) References Cited

U.S. PATENT DOCUMENTS 3,958,118 A    5/1976 Schwarz 5,101,141 A    3/1992 Warner et al.

FOREIGN PATENT DOCUMENTS

JP          403075434    *  3/1991   .................. 236/47

OTHER PUBLICATIONS

Glolab How Infrared motion detector components work.

* cited by examiner

*Primary Examiner*—William Wayner
(74) *Attorney, Agent, or Firm*—Carlson, Gaskey & Olds

(57) ABSTRACT

A temperature control system utilizes detected occupancy and activity levels to automatically condition a response of an HVAC system to a difference between a setpoint temperature and an actual temperature within a zone. The illustrated example includes an infrared sensor that provides at least one signal indicating the activity and occupancy levels in the zone. A neural network processes the sensor signal to provide an indication of the occupancy and activity levels to a controller. The controller automatically adjusts at least one control parameter of the HVAC system to compensate for changes in the occupancy or activity levels that would affect the temperature comfort setting in the zone.

20 Claims, 1 Drawing Sheet

TEMPERATURE CONTROL STRATEGY UTILIZING NEURAL NETWORK PROCESSING OF OCCUPANCY AND ACTIVITY LEVEL SENSING

BACKGROUND OF THE INVENTION

This invention generally relates to temperature controls for buildings. More particularly, this invention relates to a temperature control arrangement that utilizes occupancy and activity level sensing to automatically customize the temperature control.

Temperature control arrangements for buildings typically include a thermostat device that allows an individual to choose a setpoint temperature so that the heating or cooling system will operate to compensate for any difference in the actual temperature and the setpoint temperature in a conventional manner. Recent advances in thermostat devices include programmable thermostats that allow an individual to select various setpoint temperatures at different time periods during a week, for example. Based upon the individual's knowledge regarding occupancy and use, the setpoint temperatures can be set in a manner that minimizes energy usage and, therefore, provides a cost savings during system operation.

While programmable thermostats are an advancement they are not capable of addressing situations where the individual's predictions on occupancy and use vary from what actually occurs. Additionally, an individual may not fully appreciate available variations in temperature that still provide a comfortable environment, given the number of individuals in a room or portion of a building and the activities performed by those individuals.

There is a need for an intelligent, automated temperature control arrangement that provides customized temperature settings responsive to changes in occupancy and activity levels within a zone. This invention addresses that need in a unique manner.

SUMMARY OF THE INVENTION

In general terms, this invention is a temperature control assembly that automatically adjusts the operation of an air conditioning or heating system responsive to detected occupancy and activity levels within a zone.

A system designed according to this invention includes a thermostat device that allows an individual to select a setpoint temperature for a zone. A sensor detects whether at least one individual occupies the zone and the level of activity within the zone. The sensor provides at least one signal indicating the detected occupation and activity levels. A neural network receives the sensor signal and provides an output classifying the sensed activity and occupation levels. A controller communicates with the neural network and automatically conditions the air conditioning or heating system response to a difference between a current temperature in the zone and the selected setpoint temperature.

In one example, the sensor comprises a passive infrared pyroelectric sensor that provides a voltage signal indicating occupancy and activity levels. A signal conditioner preferably provides a mean and variance of the sensor signal to the neural network. The neural network includes a plurality of layers with selectively adjustable strengths so that the neural network output corresponds to the sensed activity and occupancy levels as desired.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
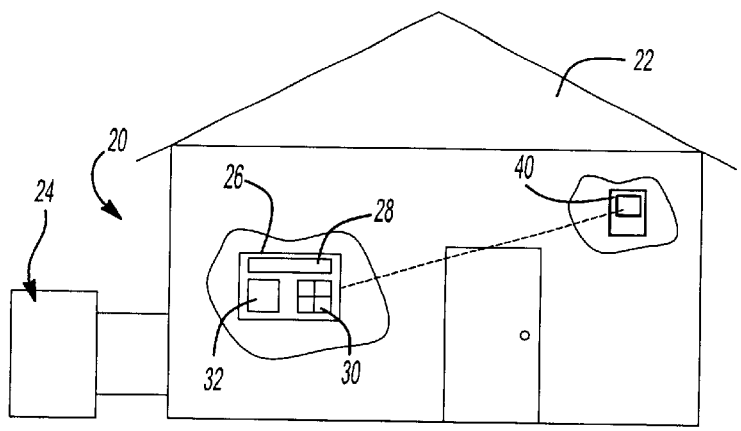
FIG. 1 schematically illustrates a system designed according to this invention.

A temperature control system 20 is useful for controlling the temperature within a building 22. This invention is not specifically limited to entire building control. The control strategy of this invention may be utilized to control the temperature within a portion or zone within a building or an entire building, depending on the needs of a particular situation.

A heating, ventilation and cooling (HVAC) system 24 is schematically illustrated, which can be an air conditioning system, a heat pump or another HVAC system as desired. In the illustrated example, the system 24 includes a compressor, condenser, evaporator and fan assembly (as known) to provide cooling of warm ambient air. A thermostat device 26 facilitates an individual controlling the operation of the HVAC system 24 to keep the temperature within the building 22 at a desired level. The HVAC system operates in a conventional manner responsive to command signals provided by the inventive arrangement.

The illustrated thermostat device includes a display portion 28 that allows an individual to view a current setpoint temperature and current temperature within the building 22, for example. The current temperature is available from a conventional temperature sensor associated with the thermostat device 26.

A user interface 30, such as a keypad in one example, allows an individual to input information into the thermostat device 26. For example, the user interface 30 allows an individual to program a plurality of time periods during which different setpoint temperatures are desired through the course of the week. A controller 32 within the thermostat device 26 is responsible for carrying out the individual's indicated preferences for temperature control. Although illustrated as a portion of the thermostat device 26, the controller 32 may be embodied in other portions of the HVAC system 24 or could be maintained in a separate housing, depending on the needs of a particular situation. In one example, the controller 32 is a microprocessor. Given this description, those skilled in the art will be able to select from among commercially available microprocessors, dedicated circuitry, software or a combination of those to realize a controller that operates as the controller 32 of this example system.

A sensor 40 preferably is positioned in one or more strategic locations within the building 22. The sensor 40 communicates with the controller 32 to provide information to the controller regarding occupancy and activity levels within the building 22 (or the corresponding zone) in a known manner. In one example, the sensor 40 is a commercially available passive infrared pyroelectric sensor.

In one example, the sensor 40 provides a voltage signal to the controller 32, which provides an indication of the occupancy and activity level within the building 22 in a known manner.

Figure 2:
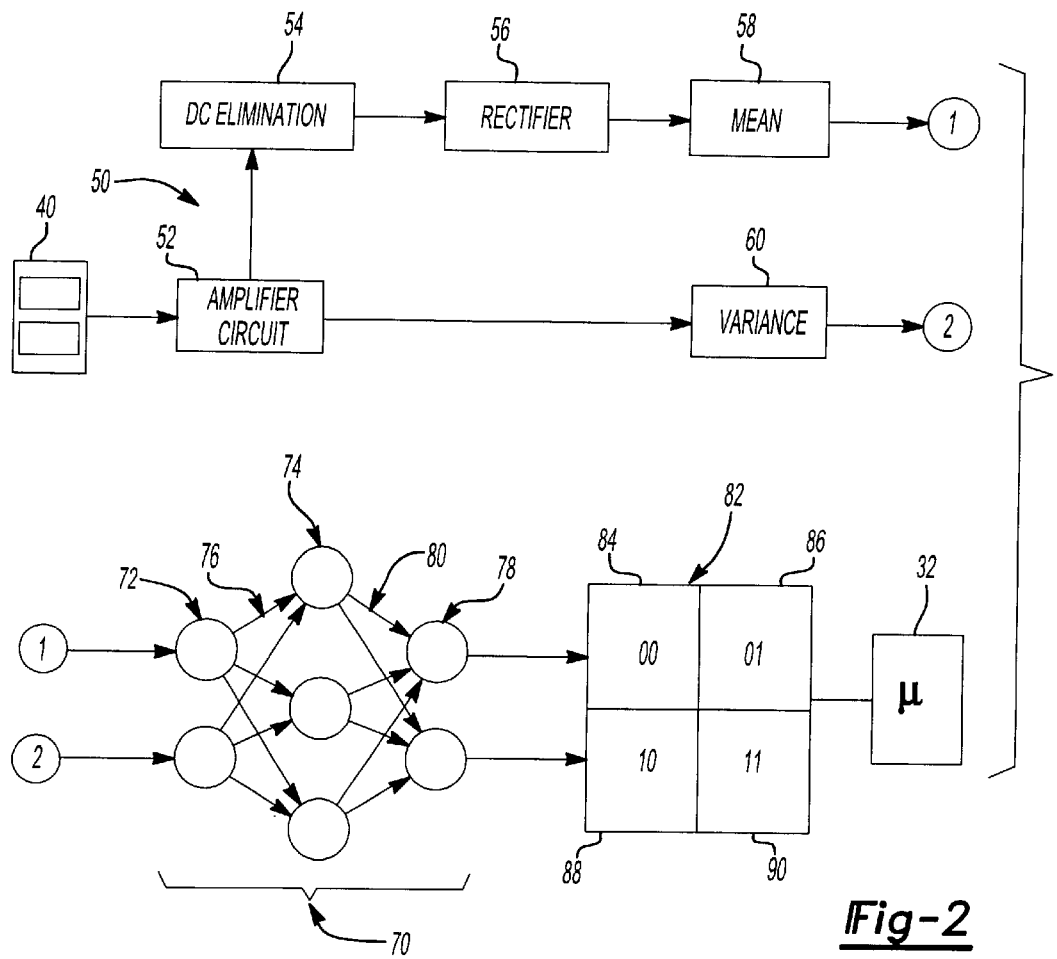
FIG. 2 schematically illustrates, in somewhat more detail, selected portions of the system shown in FIG. 1.

As can best be appreciated from FIG. 2, the system 20 preferably includes a sensor signal conditioning portion 50. An amplifier module circuit 52, such as electrical circuit, amplifies the signal from the sensor 40. The signal from the sensor 40 preferably is separated into digital and analog components. A DC elimination module 54 and a rectifier 56 process the amplified sensor signal so that a mean value determining portion 58 provides an analog output indicating the mean of the sensor signal. A variance determining portion 60 provides an output that indicates the variance of the signal from the sensor 40. In one example, the mean portion is an analog signal while the variance portion is a digital signal.

The analog and digital signals derived from the sensor output are provided to a neural network 70. In the illustrated example, the neural network 70 includes an input layer 72 of neurons that receives the information from the signal conditioner 50. The signals received at the input layer 72 are processed by a hidden layer of neurons 74 after being communicated to the hidden layer 74 through selectively adjustable strengths or weights 76. In one example, the hidden layer neurons implement a sigmoidal type function. The results of the processing within the hidden layer 74 are then communicated to an output layer 78 through another set of selectively adjustable strengths or weights 80. The output layer neurons preferably perform the same computations as the neurons in the hidden layer 74.

Neural networks are known. Those skilled in the art who have the benefit of this description will be able to select an appropriate neural network architecture with selectively adjustable weights or strengths so that the processing within the neural network 70 provides an output that is useful by a controller such as a microprocessor to make a determination regarding current occupancy and activity levels within the zone of interest.

The neural network preferably has selectively adjustable strengths or weights 76 and 80 so that the neural network 70 can be trained to provide an output consistent with a particular activity and occupancy level sensed by the sensor 40. It is known how to adjust strengths and weights within a neural network and those skilled in the art who have this benefit of this description will be able to do so using conventional techniques.

In the illustrated example, the output from the output layer 78 of the neural network 70 is shown at 82. In this example, one of four possible output values are provided. A first value 84 is a binary 00, which indicates that the zone of interest is not occupied. A second output 86, which is a binary 01, indicates that the zone is occupied but the level of activity is low. This may correspond, for example, to having one or two individuals in a zone sitting and reading a book or watching television.

A third output 88, which is a binary 10, corresponds to an occupied zone with a medium level of activity. An example would be one or more individuals in a room moving about performing basic tasks such as cooking or cleaning. A fourth output 90, which in the illustrated example is a binary 11, indicates an occupied room with a high activity level. An example of this would be where one or more individuals are exercising or playing within the zone.

In the illustrated example, the output layer 78 includes two neurons. Each neuron provides a single bit binary output (i.e., a 1 or a 0). The combined binary outputs from the two neurons of the output layer 78 provide the two binary digit values in the illustrated outputs 84–90.

The output 82 from the neural network 70 is processed by the controller 32, using a look up table, for example, so that the controller 32 determines the occupancy and activity level within the zone 22. The controller 32 may also be programmed to process the output 82 in another manner. Given this description, those skilled in the art will be able to chose the approach that best suits their particular needs.

The controller 32 preferably conditions the HVAC system response to a difference between the user-selected setpoint temperature and the current actual temperature within the zone. When the controller 32 determines different occupancy and activity levels are present, the controller 32 preferably automatically conditions the response of the HVAC system by adjusting one or more control parameters. In one example, the controller 32 automatically adjusts the setpoint temperature (i.e., changes it from the user selected value) responsive to one or more of the determined occupancy and activity level outputs from the neural network. For example, during a cooling season if the user-selected setpoint temperature will provide adequate cooling for a low or medium activity level, the controller 32 may not make any adjustment to the response of the HVAC system 24 to a temperature difference between the current temperature and the setpoint temperature. On the other hand, when the activity level is high, the controller 32 may automatically lower the setpoint temperature by a few degrees to provide additional cooling to compensate for the heat generated by the high activity level within the zone. In this manner, the controller 32 automatically provides a more consistent comfort level within the zone.

Other control parameters that may be automatically adjusted by the controller 32 include compressor frequency (for HVAC systems that include a compressor that compresses refrigerant), fan speed, or control signal gain. Given this description, those skilled in the art will realize that a variety of control parameters may be adjusted responsive to different occupancy and activity levels sensed within a zone.

Given this description, those skilled in the art will be able to suitably program a controller 32 to perform the desired operation based upon the neural network output information.

In one example, when the output of the neural network indicates that the zone is not occupied (i.e., the output 84), the controller 32 turns off the HVAC system. This may be useful, for example, when a family leaves their home for a day or more and forgets to adjust the temperature settings. While the building is not occupied, it may not be necessary to operate the HVAC system 24 and that could provide substantial energy savings. In one example, the controller 32 only completely shuts down the HVAC system under certain temperature limitations. For example, in colder climates where it is necessary to maintain some heat level within a building even when it is not occupied (to prevent against freezing pipes, for example), the controller 32 ensures that the HVAC system operates to heat the zone as needed to keep a minimal heating level at all times.

The neural network 70 preferably is trainable to provide the output 82 consistent with particular sensor inputs. The neural network 70 in one example is pretrained before being provided to a customer with certain predetermined outputs corresponding to expected input sensor signal levels. In another example, the thermostat device 26 is capable of allowing an individual to use the user interface 30 to retrain the neural network 70 to provide outputs consistent with particular sensor input levels that may be experienced within a particular location. In this manner, the inventive arrangement allows an individual to customize the response of the controller 32 by selectively adjusting the weights or strengths 76 and 80 within a neural network 70. The adjustment of those weights or strengths within the neural network is accomplished in a conventional manner.

While one example implementation of this invention has been illustrated and discussed, those skilled in the art will realize that a variety of modifications can be made. More complex neural network architectures, for example, could be implemented. More possible neural network outputs than those illustrated also may be implemented. The illustrated example shows how the inventive arrangement provides a customizable, enhanced temperature control system that more conveniently and economically provides a consistent temperature comfort level without requiring continued manual adjustment by an individual.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A temperature control assembly, comprising:
   a thermostat device that allows an individual to select a setpoint temperature for a zone;
   a sensor that detects whether at least one individual occupies the zone and a level of activity within the zone, the sensor providing at least one signal indicating the detected occupation and activity level;
   a neural network that receives the sensor signal and provides an output classifying the sensed activity and occupation levels; and
   a controller that receives the neural network network output and automatically conditions a response to a difference between a current temperature in the zone and the selected setpoint temperature.

2. The assembly of claim 1, including a sensor signal modifier that provides a digital and an analog output to the neural network that are indicative of a variance and mean of the sensor signal, respectively.

3. The assembly of claim 1, wherein the neural network comprises an input layer that processes a mean and variance of the sensor signal, a hidden layer coupled to the input layer through first selectively adjustable strengths and an output layer coupled to the hidden layer through second selectively adjustable strengths, the output layer providing the network output.

4. The assembly of claim 3, wherein the output layer comprises neurons that each provide a one bit output value and wherein the combined output values indicate one of four possible conditioned responses.

5. The assembly of claim 3, wherein the network is trainable to adjust the strengths responsive to a selected sensor input such that the network output has a selected value.

6. The assembly of claim 5, wherein the network is trainable in a manner that allows a previously selected strength to be adjusted to a new strength.

7. The assembly of claim 1, wherein the controller causes there to be no response to the temperature difference when the network output indicates that the zone is not occupied.

8. The assembly of claim 1, wherein the controller automatically adjusts the setpoint temperature responsive to at least one selected network output.

9. The assembly of claim 1, wherein the controller automatically adjusts a performance of a selected portion of a HVAC system associated with the thermostat responsive to at least one selected network output.

10. The assembly of claim 1, wherein the sensor comprises a passive infrared pyroelectric sensor.

11. A method of controlling a temperature in a zone where a thermostat provides an indication of a selected setpoint temperature, comprising the steps of:
    detecting whether the zone is occupied by an individual;
    determining an activity level within the zone;
    using a neural network to generate an output indicating the detected occupancy and the determined activity level; and
    automatically responding to the neural network output by adjusting a response to a difference between the setpoint temperature and a current temperature in the zone.

12. The method of claim 11, including training the neural network by providing a selected input indicating a known occupancy level and a known activity level and adjusting strengths of the neural network to condition the output of the network to a desired value responsive to the selected input.

13. The method of claim 12, including changing at least one of the adjusted strengths responsive to a second selected input indicating the known occupancy and activity levels.

14. The method of claim 11, including preventing any response to the temperature difference when the network output indicates that the zone is not occupied.

15. The method of claim 11, including automatically changing the setpoint temperature responsive to at least one network output.

16. The method of claim 11, including automatically adjusting a performance parameter of a HVAC system associated with the thermostat responsive to at least one network output.

17. The method of claim 11, including using a sensor to provide an indication of the occupation level and activity level and using a mean and variance of the sensor output in the neural network to generate the network output.

18. An air conditioning system, comprising:
    a compressor that selectively compresses a refrigerant fluid;
    an condenser in fluid communication with the compressor;
    an evaporator in fluid communication with the condenser and the compressor;
    a fan that moves air across at least portions of the evaporator to provide the air to a selected zone;
    a thermostat that allows an individual to select a setpoint temperature for the zone and provides an indication of a current temperature in the zone;
    at least one sensor that provides at least one signal responsive to a detected occupancy level and activity level in the zone;
    a neural network that processes the sensor signal and provides an output indicating the level of occupancy and activity in the zone; and
    a controller that automatically adjusts a response of the system to a difference between the selected setpoint temperature and the actual temperature in the zone responsive to the network output.

19. The system of claim 18, wherein the controller automatically does at least one of turning off the system, changing the setpoint temperature, changing the compressor frequency, or changing the fan speed responsive to a corresponding network output.

20. The system of claim 18, including a sensor signal conditioner that provides a mean and variance of the sensor signal to the neural network.

* * * * *